US008879832B2

(12) United States Patent
Dalal et al.

(10) Patent No.: US 8,879,832 B2
(45) Date of Patent: Nov. 4, 2014

(54) COLOR MATRIX CODE

(75) Inventors: Edul N. Dalal, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 228 days.

(21) Appl. No.: 13/533,459

(22) Filed: Jun. 26, 2012

(65) Prior Publication Data

US 2013/0343645 A1    Dec. 26, 2013

(51) Int. Cl.
*G06K 9/00*    (2006.01)

(52) U.S. Cl.
USPC . 382/162; 382/100; 235/462.01; 235/462.04; 235/494; 347/241

(58) Field of Classification Search
USPC ........ 382/100, 162; 235/462.01, 462.04, 494; 347/241
See application file for complete search history.

(56) References Cited

U.S. PATENT DOCUMENTS

| 5,978,009 | A | * | 11/1999 | Fujikura | 347/237 |
| 7,639,392 | B2 | * | 12/2009 | Li et al. | 358/1.9 |
| 7,936,901 | B2 | | 5/2011 | Jancke | |
| 8,038,064 | B2 | | 10/2011 | Ming et al. | |
| 8,047,447 | B2 | | 11/2011 | Bulan et al. | |
| 8,218,207 | B1 | * | 7/2012 | Harrison, Jr. | 358/518 |
| 2005/0284236 | A1 | * | 12/2005 | Kielb et al. | 73/861.42 |
| 2006/0098241 | A1 | * | 5/2006 | Cheong et al. | 358/463 |
| 2011/0186632 | A1 | * | 8/2011 | Yi et al. | 235/437 |
| 2012/0118970 | A1 | * | 5/2012 | Zolotov | 235/462.04 |

FOREIGN PATENT DOCUMENTS

JP    0422220    *    4/1991    ............... G06T 5/50

OTHER PUBLICATIONS

Groff, et al., "Invertible Piecewise Linear Approximations for Color Reproduction", Proceedings of the 1998 IEEE, International Conference on Control Applications, Trieste, Italy, Sep. 1-4, 1998, pp. 716-720.

* cited by examiner

*Primary Examiner* — Chan Park
*Assistant Examiner* — Eueng-Nan Yeh
(74) *Attorney, Agent, or Firm* — Fox Rothschild LLP (57) ABSTRACT

When an imaging device receives an image file that includes a color barcode, a processor of the imaging device and/or a remote processor may decode the barcode by identifying informational elements and calibration elements in the barcode. When the calibration elements are detected, one or more color model parameters are determined, and a color model is developed. When an informational element is then detected, a color value is determined for the informational element, the color model is applied using the color model parameters to yield an adjusted color value for the informational element, and the adjusted color value is used to decode the color barcode.

23 Claims, 5 Drawing Sheets

COLOR MATRIX CODE

BACKGROUND

Barcodes, particularly multi-dimensional matrix codes, have recently become more prevalent in everyday life. Examples of matrix code applications include inventory control, product information, ticketing, security, and identification. With this increased use of matrix codes, it has become necessary to encode more data within the code without significantly increasing the size of the code or decreasing the size of the bits within the code. However, typical binary matrix codes are limited by the amount of data they can hold because each data bit can only have two possibilities (white/light or black/dark).

Previous attempts to solve this problem have incorporated color into the matrix code as a method of increasing the amount of data the code can hold because a color data bit can have many more than two color possibilities. However, with the use of electronic devices such as smartphones and the like to display the matrix code, it is difficult for a barcode reader to accurately perceive the colors that are intended to be displayed by the electronic device because of the wide variation of color presentation across a multitude of devices, as well as changes resulting from the device's environment, such as lighting.

This document describes methods and systems that may solve at least some of the issues described above.

SUMMARY

In an embodiment, in a method of decoding a color barcode, an imaging device may capture an image of a color barcode and convert the image to an image file. The barcode, and thus the image file, includes informational elements and calibration elements. The method includes detecting the calibration elements, determining one or more color model parameters, and identifying a color model. The color model may include a piecewise linear approximation, a gamma function, a matrix, a polynomial, or another model. The method also includes detecting a set of the informational elements, identifying a color value for each of the detected informational elements, applying the color model parameters to the color model to yield one or more adjusted color values for one or more of the detected informational elements, and using the one or more adjusted color values to decode the color barcode.

Optionally, when detecting the one or more calibration elements, the method may include detecting one or more position detection pattern locations in the color barcode. Based on the one or more position detection pattern locations, the method may include determining a position in the image for the calibration elements, and then identifying the calibration elements as those elements that are located in the determined position. For example, detecting the calibration elements may include: recognizing an image of three position detection patterns, each of which is located in a corner of a square; determining an orientation of the square based on the corners in which the position detection patterns are located; and determining a calibration element location based on the locations of the position detection patterns and the orientation of the square.

Optionally, when determining the one or more color model parameters, the method may include determining a color value for each of the detected calibration elements in the image, comparing each determined color value to a set of stored color values for each of the detected calibration elements to identify a relationship between them, and using the relationship to determine the color model parameters.

Some or all of the steps described above may be implemented by a processor, executing programming instructions that are contained in a computer-readable memory. In addition, the system may include an imaging device that captures the image of the barcode and converts the image to an image file. Optionally, the system also may include a display that presents the barcode to the imaging device.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and a tangible, computer-readable memory. The memory may contain programming instructions that, when executed by the processor, cause the device to perform one or more operations according to the programming instructions. Examples of electronic devices may include, but are not limited to, personal computers, gaming systems, televisions, and portable electronic devices such as smart phones, personal digital assistants, cameras, tablet computers, laptop computers, GPS navigation devices, media players and the like.

The term "data" may refer to physical signals that indicate or include information. A "data bit" may refer to a single unit of data. An "image," as a pattern of physical light or a collection of data representing the physical light, may include characters, words, symbologies, graphics and other features, as well as combinations thereof. A "digital image" is by extension an image represented by a collection of digital data.

A "barcode" is a pattern or symbol that is displayed on a surface and which represents data. Barcodes may be an optical, machine-readable representation of data. Barcodes may include, without limitation, one-dimensional symbologies, two-dimensional (2D) symbologies, or three-dimensional symbologies. Examples of two-dimensional barcodes include Data Matrix codes, Quick Response codes, Aztec codes, Maxi codes and the like. The barcodes may be displayed on an electronic display, and may be of any geometric shape or size. In this document, the terms "barcode" or "matrix code" may be used in the examples, but the term is intended to include any such symbology.

A "color model" is a model that may be used as a key for converting or translating perceived colors to the actual colors that are intended to be displayed. The application of a color model by an imaging device may result in revised color values, which may be closer to the actual intended color values for the colors that the imaging device is perceiving. "Color model parameters" may refer to programming instructions found within the code of barcode that instruct an imaging device to assign a color value to a perceived color or group of colors.

Figure 1:
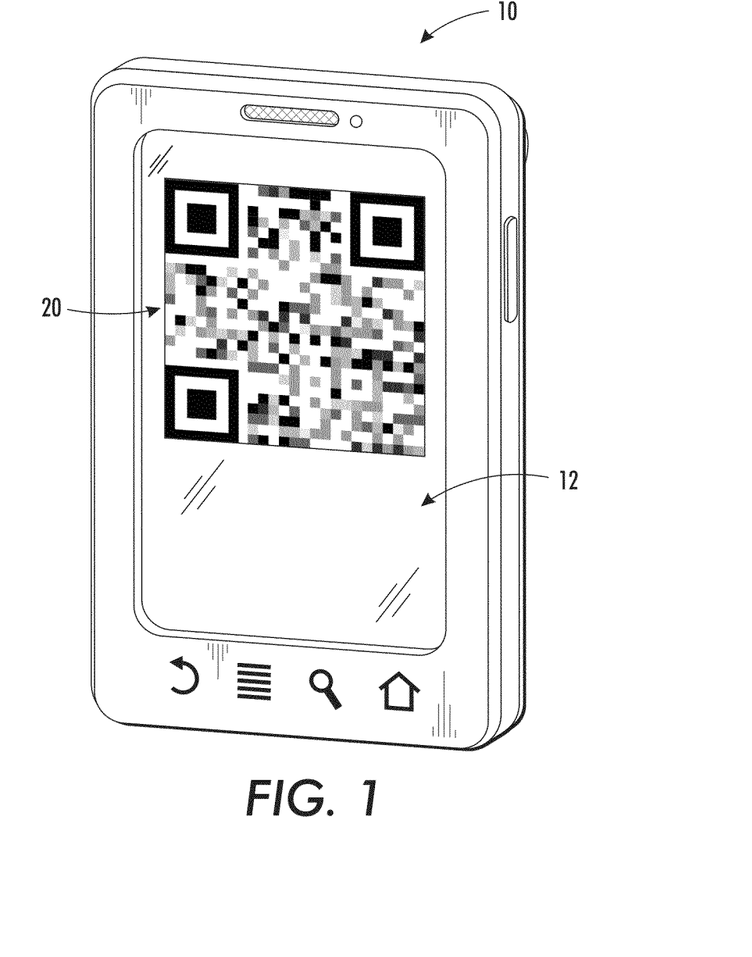
FIG. 1 depicts an electronic device with a display for displaying barcodes in accordance with an aspect of the present disclosure.

Referring to FIG. 1, an electronic device, generally designated 10, may contain a display 12. The display 12 is capable of displaying a digital image of a color barcode such as a matrix code 20. The display may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The digital image displayed by the display 12 may generally be presented in such a way that it can be viewed by an optical reader such as a barcode scanner, as described in further detail herein. Accordingly, the display 12 may be capable of adjusting one or more image settings, such as brightness, contrast, backlight, tint, color, sharpness and the like.

Figure 2:
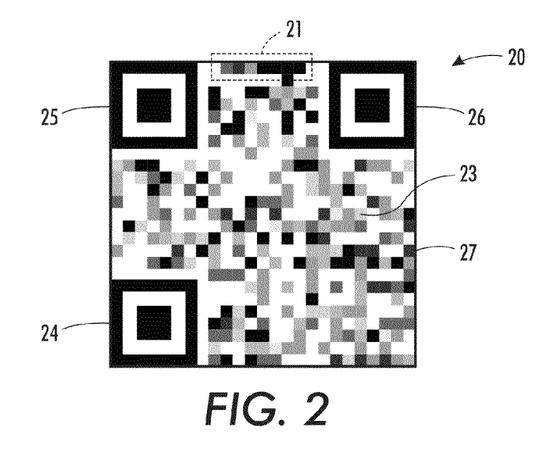
FIG. 2 depicts one embodiment of a barcode in accordance with an aspect of the present disclosure.

Referring to FIG. 2, a barcode according to an aspect of the present disclosure may be a matrix code 20. The matrix code 20 may contain a reference section that includes a set of calibration elements 21, one or more position detection elements 24, 25, 26 and a data portion 23 made of a set of informational elements. Each element may be a pixel or a group of pixels.

The data portion 23 may generally comprise the portion of the matrix code 20 that is not occupied by the reference portion 21, and the position detection elements 24, 25, 26. The data portion 23 may further contain a set of color data bits 27 that represent data. Each of the color data bits 27 may be one or more pixels that together exhibit any color within the color spectrum. In some embodiments, each color bit may be associated with a color value that is stored in a memory. For example, each color value may be an integer from 0 (black) to 255 (white), although other values and ranges are possible. Each pixel may have a numeric set of values, such as red-green-blue (RGB) values that indicate a color that should be displayed. The shape of each color data bit 27 as depicted herein is square. However, it is possible that each color data bit 27 may be any shape, such as circles, rectangles, triangles, lines, and the like. The shape of each color data bit 27 may be consistent for all of the color data bits, or the color data bits 27 may incorporate varying shapes. The data portion 23 may further contain coding for any type of data information, such as links to internet websites, text information, encryption keys and the like.

In the example of two-dimensional barcodes, such as the data matrix codes designed to be read by QR CODE® readers, the position detection patterns 24, 25, 26 may generally be black in color and may be disposed at three of the four corners of the matrix code 20. The position detection patterns 24, 25, 26 may be characterized by a pattern consisting of a large square of black cells, a middle square of white cells concentric with but smaller in size than the large square, and a small square of black cells concentric with but smaller in size than the middle square. Other position detection pattern configurations, colors, and any number of position detection patterns may be used, either with two-dimensional barcodes or with other types of barcodes.

The position detection patterns 24, 25, 26 are known patterns of pixels that an imaging device 50 may use to determine the correct positional alignment of the barcode 20. For example, in the context of a two-dimensional barcode, if the imaging device contains programming code with instructions to recognize a barcode if it receives an image of three position detection patterns positioned in the lower left, upper left and upper right corners of a square, the device may then read matrix code 20 as being "right side up" when the position detection patterns 24, 25, 26 are located in the lower left, upper left and upper right, respectively. It may also then know that the remaining portions of the square are made of data elements and reference elements. Instructions stored in memory also may contain instructions about relative location of the reference elements with respect to the position detection patterns, so that when the device detects the position detection pattern it will determine the location of the reference elements in the received image. While only one positional configuration is mentioned in this document, other configurations for determining positions of the barcode or any of its elements are also possible.

The reference portion 21 may contain a calibration code, which may be used by the imaging device 50 (FIG. 5) to calibrate the device to the colors used in the matrix code 20. The present disclosure depicts the reference portion 21 as being located at the top-center of the matrix code 20, but the reference portion 21 may be positioned at any location within the matrix code 20 or alternatively may be positioned at a location outside the matrix code 20. The location of the reference portion 21 may be known by the imaging device 50 (FIG. 5) as will be described below.

Figure 3:
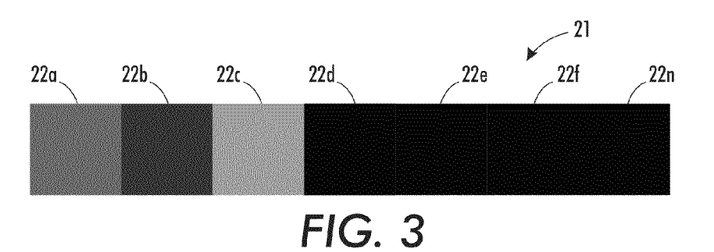
FIG. 3 depicts a detailed view of the reference portion of the barcode of FIG. 2.

As shown in greater detail in FIG. 3, the reference portion 21 may contain a calibration code having any number of colorized calibration elements 22*a* . . . 22*n*. The colorized calibration elements 22*a* . . . 22*n* may each contain one or more pixels that exhibit various colors. The colorized calibration elements 22*a* . . . 22*n* collectively represent at least two colors, and in the example shown represent seven colors. In some embodiments, the calibration elements represent and display between 2 and 16 colors, between 4 and 10 colors, approximately 8 colors, up to 10 or up to 20 colors, or any other number. Each calibration element may exhibit any color within the color spectrum. The shape of each colorized calibration element as depicted herein is square. However, the calibration elements may be any shape, such as circles, rectangles, triangles, lines, and the like. The shape of each colorized calibration element may be consistent for all of the calibration tiles, or the calibration elements may incorporate varying shapes.

The colorized calibration elements may generally be positioned together in a group. While the present disclosure depicts the group of colorized calibration elements 22*a* . . . 22*n* appearing in a single row, the elements may be arranged in a different configuration, such as multiple rows, columns, a square or rectangle, and/or the like.

Figure 4:
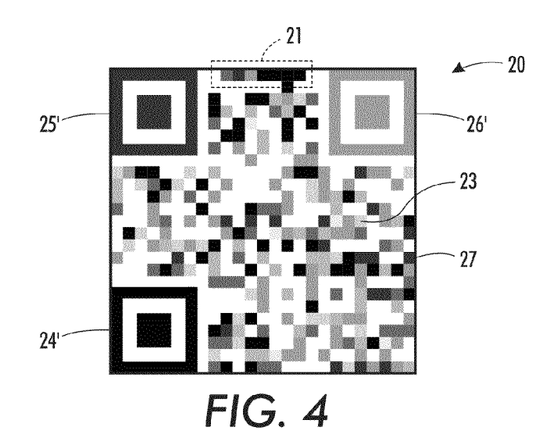
FIG. 4 depicts another embodiment of a barcode in accordance with an aspect of the present disclosure.

As shown in FIG. 4, the position detection patterns 24', 25', 26' may alternatively be colored. Accordingly, the position detection patterns 24', 25', 26' may be used to provide positional alignment and to provide additional color calibration to supplement the colorized calibration elements. In the case where 7 calibration patches are used for determining color model parameters, one can apply up to 3 of the 7 colors at patterns 24', 25' and 26', leaving only 4 required calibration elements, thereby freeing up more resources for the actual message data. For another example, one can still use 7 colorized calibration elements in the reference portion 21, but additional repeats of 3 of the 7 calibration elements can be applied at patterns 24', 25', 26' for better measurement on those selected 3 colors, since the areas of patterns 24', 25', and 26' are typically larger and thus there may be less measurement noise than in the calibration elements 22a . . . 22n. One can also use any combination between the above two examples.

Figure 5:
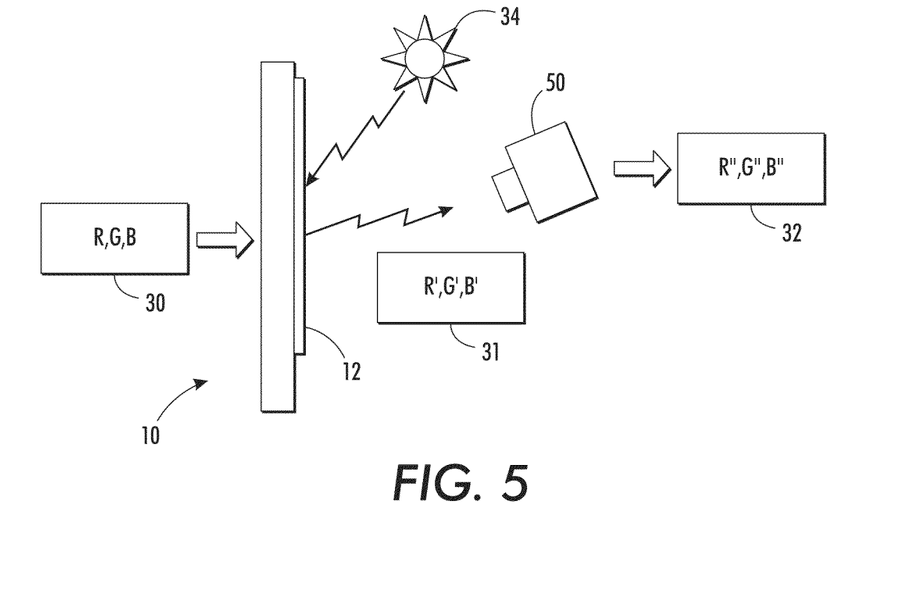
FIG. 5 depicts a schematic diagram of color translation in accordance with an aspect of the present disclosure.

FIG. 5 depicts a schematic diagram of a scanning and reading process. The electronic device 10 displays an image of a color barcode and may be positioned in such a way so that its display 12 faces an imaging device 50. The imaging device 50 may then read the displayed barcode.

The imaging device 50 may be any device capable of scanning and/or decoding a barcode such as a matrix code. Examples of imaging devices may include, for example, pen-type readers, CCD readers, camera-based readers, omni-directional barcode scanners, telephone (cell phone and smartphone) based scanners and the like.

The imaging device 50 may generally contain a lens and a light sensor, wherein the light sensor may translate optical impulses into electrical signals. The imaging device 50 may further have a processor and a non-transitory, computer readable memory. The memory may contain programming instructions for the processor to cause the processor to complete tasks such as analyzing barcode image data provided by the light sensor, determining and developing color models, decoding the data and optionally transmitting the data to another device and/or component. The imaging device also may include a wireless or wired transceiver that communicates with a remote electronic device via a communications network. Optionally, the remote electronic device may contain a processor, memory and programming instructions, and the remote electronic device may perform some or all of the image processing and decoding steps.

The electronic device may display the barcode on its display 10 using a first set of color values 30. The color values may be, for example, a set of integers that, for each pixel, provide RGB values for each pixel in the barcode as displayed on the display 12. The display 12 may then output the barcode. The display 12 may output some or all of the pixels using the first set of color values. Alternatively, because of intrinsic characteristics or limitations of the construction of the display or programming of the device, the colors presented by the display or the device may differ from first set of color values 30, and may exhibit a second set of color values 31 containing, for example, a second set of RGB values for each pixel. The second color value set 31 may be identical to the first color value set 30, or it may be slightly altered based upon color, brightness, tint, contrast, or other settings or distortions or limitations of the display 12. When capturing an image of the barcode, the imaging device 50 may detect one or more of the pixels as having a color value that differs from the value of the same pixel(s) in the first color value set 30 or the second color value set 31. Thus, the imaging device may perceive a third color value set 32 due to inherent limitations of the imaging device, flare 34 cast from ambient light, interference or noise between the imaging device and the barcode, or other factors.

Figure 6:
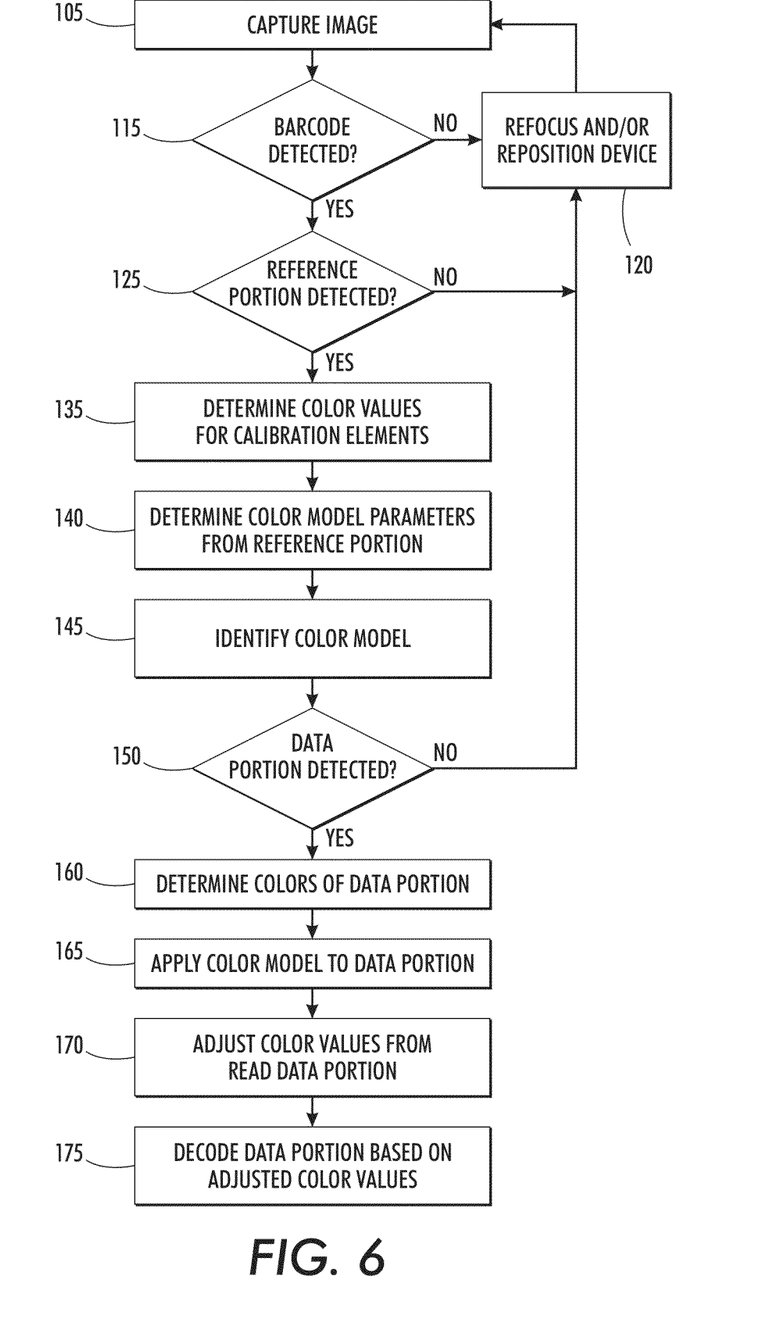
FIG. 6 is a flowchart describing the process for reading and decoding a barcodes in accordance with an aspect of the present disclosure.

FIG. 6 depicts a process for reading and decoding the color barcode. First, the imaging device may capture an image 105 such as by reading the display of an electronic device or a substrate. The device, or a processor that is remote from the device, may analyze the image and attempt to detect a barcode in the image 115. (As used in the discussion of FIGS. 6 and 7 and in the claims, a "processor" will refer to either a processor that is integral with the imaging device or a processor that is remote from the imaging device. The processing steps may be performed by a single processor or a combination of processors.) The detection may be done using any suitable method, such as when a number of known positional patterns are detected in their expected relative positions. If a barcode is not detected, the imaging device may automatically refocus, automatically adjust settings, or direct a user to reposition the imaging device and/or the electronic device to obtain another reading 120.

If the barcode is detected, the processor may attempt to detect a reference portion 125 containing a set of calibration elements in the barcode. This may be done based on computer-readable instructions that instruct the processor to establish as the reference portion a location that is a predetermined number of pixels (or other measurement) away from one or more of the positional patterns. Alternatively, the processor may use pattern recognition to look for a predetermined reference pattern in the barcode. Other methods are possible.

If a reference portion has been detected, the processor may determine a color value for each of the calibration elements in reference portion 135. If the reference portion is not detected, or if color values cannot be determined, the imaging device may automatically refocus, automatically adjust settings, or direct a user to reposition the imaging device and/or the electronic device to obtain another reading 120.

Once the color values have been determined for the calibration elements, the processor may then determine a set of color model parameters obtained from the encoding within the reference portion 140. For example, the processor may compare the determined value of each calibration element to a set of expected or known calibration element values. Referring to FIG. 3, a set of expected calibration element values may include: a value of (100, 0, 0) representing red for the calibration element in the leftmost or first position 22a; (0, 100, 0) representing green for the calibration element in the middle or fourth position 22e; and (0, 0, 0) representing black for the calibration element in the rightmost or seventh position 22n. RGB signal values in this disclosure are given as percentages (0-100 scale) rather than as 8-bit values (0-255 scale). Returning to FIG. 6, the processor may identify a color model 145, either by developing it anew or by identifying a predetermined color model (i.e., a relationship between the detected values and the expected values), and in either case using the determined calibration data as parameters in this color model. As a simple example, the color model can be chosen as three independent linear functions (defined in terms of offsets and slopes) that relate input R to output R', input G to output G', and input B to output B' respectively. For this model, the relationships between RGB and R'G'B' can be described by $$R'=a_R R+o_R, \; G'=a_G G+o_G, \; B'=a_B R+o_B.$$

Here, slopes a and offsets o can be determined by the data extracted from calibration elements and known numerical methods (e.g. least-squares estimation). In this case, the output R' of the sensed red calibration element (100,0,0) and the black calibration element (0,0,0) will uniquely determine the model parameters for red response: the offset $o_R$ is the output red reading of black (0,0,0) and the slope $a_R$ is the difference of output red reading of red (100,0,0) and black (0,0,0) divided by 100. The model parameters for green and blue models can be determined in the same fashion. If additional calibration elements such as (50,0,0), (0,50,0), and (0,0,50) are used, then the color model parameters can be determined such that a least-squares error is minimized. Other color models such as piece-wise linear, higher-order polynomials (e.g., quadratic), matrices (e.g., 3×3 or 3×4) and others can be used as well. The minimal number of calibration elements needed will depend on the choice of color models. More details will be discussed later in the description of FIG. 7. Any suitable RGB model can be used, including but not limited to the examples discussed above.

The imaging device or processor also may detect a data portion of the barcode 150. If a data portion is present, the imaging device or processor may determine a color value for each of one or more of the pixels in the data portion 160. If no data portion is present, or if the results of the decoding are unclear or substantially incomplete, the imaging device may automatically refocus, automatically adjust settings, or direct a user to reposition the imaging device and/or the electronic device to obtain another reading 120.

After determining color values for the data portion, the processor may then use the color model parameters to apply the color model to the data portion 165 and adjust its perceived color values from the read data portion according to the color model 170. This may be done by, for example, applying a transform function of the color model to each pixel's perceived color value, and thresholding the result of the transform function for each pixel to the nearest available expected color value.

The processor may then decode the data portion based upon the adjusted color values 175 to obtain the data encoded by the barcode.

Figure 7:
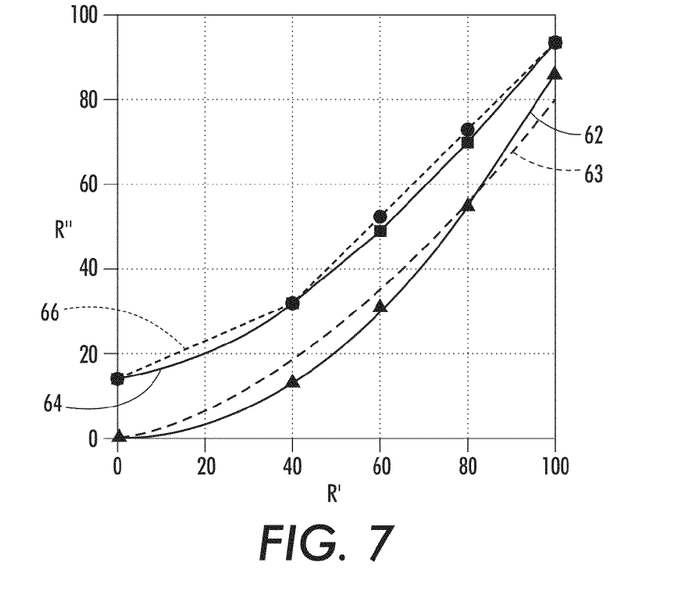
FIG. 7 is a graphical interpretation of a non-linear transfer function in accordance with an aspect of the present disclosure.

FIG. 7 depicts a graphical representation of a non-linear transfer function for an example of an R channel in an RGB model in accordance with the present disclosure. In this example, the R channel is assigned values of 0, 40, 60, 80 and 100. Curve 62 represents a series of R values (represented by triangles) that are expected for an output of a display (i.e. inputs to the color model), such as may be programmed into or used by a software application of an electronic device. However, because the application may be used by a variety of mobile phones, a given device may actually output the R values as being along line dotted curve 63. Ambient light and the characteristics and limitations of an imaging device may cause an imaging device to receive the R values (i.e. outputs for the color model) as those along curve 64 (shown with squares representing the values).

To correct for this error, a non-linear transfer function may be approximated by a color model, such as a piecewise linear function as shown by the dashed line with the circles 66. Only one intermediate value may be used for the piecewise linear approximation. However additional intermediate values may be added to provide a better approximation to the curve. The actual RGB values of the 3 vertices of the piecewise linear approximation may be read when the barcode is scanned by the imaging device by reading the reference portion containing the color elements. For the R channel, in some embodiments only 3 colorized calibration elements may be required, with the first color value of 0, 40, and 100 (on a 0~100 scale). For all three RGB channels, at least 7 colorized calibration elements may be used: black (0,0,0), mid-level (R,0,0) (0,G,0) (0,0,B) and full (100,0,0) (0,100,0) (0,0,100). In this example, R=40, and G and B are similarly defined.

By applying a calibration procedure as described herein, the imaging device may be better adapted to anticipate the second color values as indicated by the dashed line with circles 66. As indicated in FIG. 7, these second color values are much closer to the first color values, as provided by the line with the "X" symbols 64.

By using the piecewise-linear approximation as described above with a single mid-level point, five levels of each channel may be reliably encoded within the reference portion 21 (FIG. 2). By providing five levels in each of the three channels, 125 ($5^3$) matrix code colors may be calibrated by using seven calibration elements within the reference portion. However the invention is not limited to the number of channels, levels or calibration elements disclosed, and any number of channels, levels or calibration elements may be used.

In an alternative embodiment, all five levels of each channel may be included within the reference portion as calibration elements, thus avoiding a need for the piecewise-linear approximation. In this case, the total number of calibration tiles required would be 13 (i.e., [1+(5−1)*3]).

The ability to reliably calibrate 125 colors using only seven calibration patches as described in this document may provide a useful data saving feature over other color barcode reading methods known in the art. For example, in a 21×21 matrix code (version 1 matrix code) with an error correction level L (lowest), 152 data bits are available. If 125 of the data bits are used for the calibration tiles, this equates to 82% of the capacity of the matrix code being used by the reference portion, which leaves 27 data bits available for the data portion. However, if only seven calibration tiles are used for the 125 matrix code colors as described herein, only 5% of the matrix code capacity is utilized by the reference portion, thus providing 145 data bits for the data portion.

In another example, in a 45×45 matrix code (version 7 matrix code) with error correction level H (highest), 528 data bits are available. If 125 of the data bits are used for the calibration tiles, this equates to 24% of the capacity of the matrix code being used by the reference portion, which leaves 403 data bits available for the data portion. However, if only 7 calibration tiles are used for the 125 matrix code colors as described herein, less than 1.5% of the matrix code capacity is utilized by the reference portion, thus providing 521 data bits for the data portion.

The choice of color model may affect the accuracy of this approach and the number of calibration elements needed for determining the model parameters. There are practical tradeoffs. A three point piece-wise linear color model for R, G, B independently is generally sufficient (as discussed earlier, this needs 7 calibration elements in total). However, in some cases, one may prefer to use a greater number of intermediate levels for piece-wise linear models for a device known to be highly nonlinear. Some devices may be noisy, where choosing a smooth color model with parameters determined by least squares estimation may be preferred. Example color models include independent polynomials, gamma functions, etc. for R, G, and B independently. That is, one can use a color model of the following form such as:

$$R'=a_{11}R^2+a_{12}R+o_1,\ G'=a_{21}G^2+a_{22}G+o_2,\ B'=a_{21}B^2+a_{22}B+o_2,\ \text{or}$$

$$R'=a_{11}R^{\gamma 1}+o_1,\ G'=a_{21}G^{\gamma 2}+o_2,\ B'=a_{31}B^{\gamma 3}+o_2.$$

Some devices may exhibit cross-talk (e.g. the output reading of R is dependent on the reading of G). In such cases, a more complicated color model that includes interaction terms may be used, such as:

$$R'=a_{11}R+a_{12}G+a_{12}B+o_1,\ G'=a_{21}R+a_{22}G+a_{22}B+o_2,$$
$$B'=a_{31}R+a_{32}G+a_{32}B+o_2,\ \text{or}$$

$$R'=f_1(R,G,B,RG,RB,GB),\ G'=f_2(R,G,B,RG,RB,GB),$$
$$B'=f_2(R,G,B,RG,RB,GB),$$

The first equation above corresponds to a 3×3 matrix with offset terms. In the second equation above, $f_1$, $f_2$, $f_2$ are predetermined functional forms. These are examples of color models that are suitable for this work. Others are possible. The color model can be chosen based on the physics of the display device or empirically selected for devices of interest. Once the model is chosen for a given device, the model parameters can be determined using the calibration elements, and used in this method as discussed earlier. If more than one color model is allowed for a given system, the color model chosen for the display device may be identified to the imaging device, for example, by using one or more of the data bits in the barcode, or by the sequence of the calibration patches.

Figure 8:
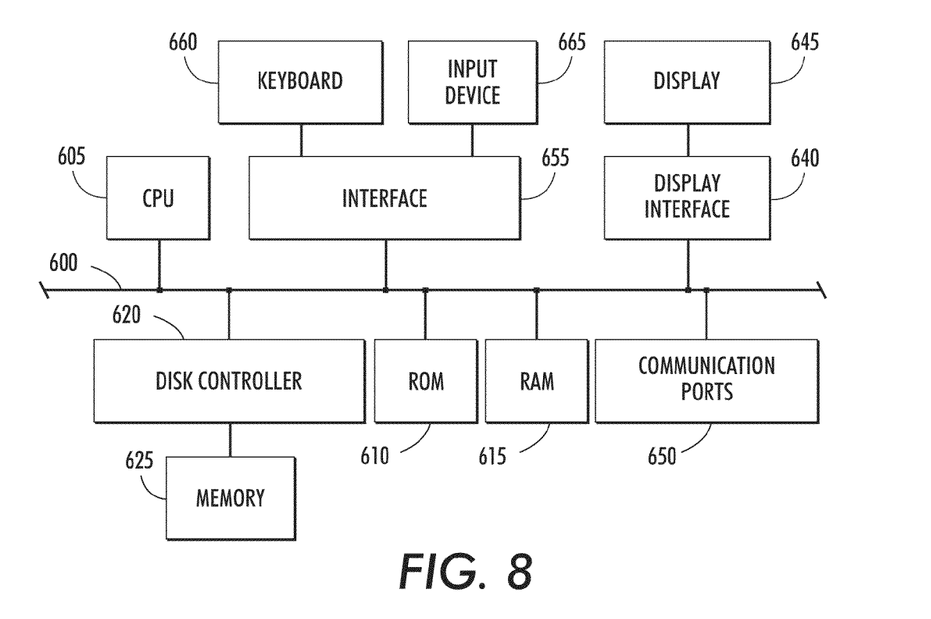
FIG. 8 is a block diagram depicting elements that may be present in an electronic device or a computing device.

FIG. 8 depicts a block diagram of internal hardware that may be used to contain or implement the various services and processing devices as discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 8, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
   by an imaging device, receiving an image of a color barcode having a plurality of informational elements and a plurality of calibration elements;
   by the imaging device, detecting the calibration elements;
   by a processor, using the calibration elements to determine one or more color model parameters for assigning a color value to a perceived color;
   by the processor, identifying a color model that comprises the determined one or more color model parameters;
   by the imaging device, detecting a set of the informational elements, each of which comprises a color data bit;
   by the processor, identifying a perceived color value for each of the detected informational elements in the set;
   by the processor, applying the one or more color model parameters to the color model to transform the perceived color values for one or more of the detected informational elements and yield one or more adjusted color values; and
   by the processor, decoding the color barcode using the one or more adjusted color values.

2. The method of claim 1, wherein detecting the one or more calibration elements comprises:
   detecting one or more position detection pattern locations in the color barcode;
   based on the one or more position detection pattern locations, determining a position in the image for the calibration elements; and
   identifying the calibration elements as those elements that are located in the determined position.

3. The method of claim 1, wherein detecting the calibration elements comprises:
   recognizing an image of three position detection patterns, each of which is located in a corner of a square;
   determining an orientation of the square based on the corners in which the position detection patterns are located; and
   determining a calibration element location based on the locations of the position detection patterns and the orientation of the square.

4. The method of claim 1, wherein determining the one or more color model parameters comprises:
   determining a color value for each of the detected calibration elements in the image;
   comparing each determined color value to a set of stored color values for each of the detected calibration elements to identify a relationship between them; and
   using the relationship to determine the color model parameters.

5. The method of claim 1, wherein the color model comprises a piecewise linear approximation.

6. The method of claim 1, wherein the color model comprises a gamma function.

7. The method of claim 1, wherein the color model comprises a matrix.

8. The method of claim 1, wherein the color model comprises a polynomial.

9. The method of claim 1, wherein applying the one or more color model parameters to the color model to yield one or more adjusted color values comprises thresholding the identified color value of at least one of the detected informational elements to the adjusted color value that is nearest to the identified color value of the informational element.

10. The method of claim 1, wherein each perceived color value and each adjusted color value comprises a set of integers that, for each informational element, provides RGB values for the informational element.

11. A system for decoding a color barcode, comprising:
a processor; and
a non-transitory computer-readable storage medium containing programming instructions that, when executed, instruct the processor to:
receive an image file of a color barcode, the image file having a plurality of informational elements and one or more calibration elements;
use the one or more calibration elements to determine one or more color model parameters for assigning a color value to a perceived color;
identify a color model that comprises the determined one or more color model parameters;
identify a set of the informational elements, each of which comprises a color data bit;
identify a perceived color value for each of the detected informational elements in the set;
apply the one or more color model parameters to the color model to transform the perceived color values for one or more of the detected informational elements and yield one or more adjusted color values; and
decode the color barcode using the one or more adjusted color values.

12. The system of claim 11, wherein the instructions further comprise instructions that, when executed, cause the processor to:
detect one or more position detection pattern locations in the color barcode;
based on the one or more position detection pattern locations, determine a position in the image for the calibration elements; and
identify the calibration elements as those elements that are located in the determined position.

13. The system of claim 11, wherein the instructions that, when executed, cause the processor to determine the one or more color model parameters comprise instructions for:
determining a color value for each of the detected calibration elements;
comparing each determined color value to a set of stored color values for each of the detected calibration elements to identify a relationship between them; and
using the relationship to determine the color model parameters.

14. The system of claim 11, wherein the instructions further comprise instructions that, when executed, cause the processor to:
detect one or more of the calibration elements;
recognize an image of three position detection patterns, each of which is located in a corner of a square;
determine an orientation of the square based on the corners in which the position detection patterns are located; and
determine a calibration element location based on the locations of the position detection patterns and the orientation of the square.

15. The system of claim 11, wherein the color model comprises a piecewise linear approximation, a gamma function, a matrix, or a polynomial.

16. The system of claim 11, further comprising an imaging device that receives an image of the barcode and converts the image to the image file.

17. The system of claim 16, further comprising a display that outputs the barcode to the imaging device.

18. The system of claim 11, wherein each perceived color value and each adjusted color value comprises a set of integers that, for each informational element, provides RGB values for the informational element.

19. A method of decoding a color barcode, comprising, by one or more processors:
receiving an image file of a color barcode having a plurality of informational elements and a plurality of calibration elements;
detecting a set of the calibration elements by:
detecting one or more position detection pattern locations in the color barcode;
based on the one or more position detection pattern locations, determining a position in the image for the calibration elements; and
identifying the calibration elements as those elements that are located in the determined position;
detecting a set of the informational elements, each of which comprises a color data bit;
using the detected calibration elements to determine one or more color model parameters for assigning a color value to a perceived color;
identifying a color model that comprises one or more color model parameters;
identifying a perceived color value for each of the detected informational elements;
applying the one or more color model parameters to the color model to one or more of the detected informational elements and yield one or more adjusted color values; and
decoding the color barcode using the one or more adjusted color values.

20. The method of claim 19, wherein determining the one or more color model parameters comprises:
determining a color value for each of the detected calibration elements in the image;
comparing each determined color value to a set of stored color values for each of the detected calibration elements to identify a relationship between them; and
using the relationship to determine the color model parameters.

21. The method of claim 19, wherein detecting the one or more position detection patterns comprises:
recognizing an image of three position detection patterns, each of which is located in a corner of a square;
determining an orientation of the square based on the corners in which the position detection patterns are located; and
determining a calibration element location based on the locations of the position detection patterns and the orientation of the square.

22. The method of claim 19, wherein the color model comprises a piecewise linear approximation, a gamma function, a matrix, or a polynomial.

23. The method of claim 19, wherein each perceived color value and each adjusted color value comprises a set of integers that, for each informational element, provides RGB values for the informational element.

\* \* \* \* \*